US008683546B2

(12) United States Patent
Dunagan et al.

(10) Patent No.: US 8,683,546 B2
(45) Date of Patent: Mar. 25, 2014

(54) MANAGING SECURITY CONFIGURATION THROUGH MACHINE LEARNING, COMBINATORIAL OPTIMIZATION AND ATTACK GRAPHS

(75) Inventors: John D. Dunagan, Bellevue, WA (US); Alice Xiao-Zhou Zheng, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 782 days.

(21) Appl. No.: 12/359,422

(22) Filed: Jan. 26, 2009

(65) Prior Publication Data

US 2010/0192195 A1 Jul. 29, 2010

(51) Int. Cl.
*G06F 21/00* (2013.01)
(52) U.S. Cl.
USPC ............................................................ 726/1
(58) Field of Classification Search
USPC ............................................................ 726/1
See application file for complete search history.

(56) References Cited

U.S. PATENT DOCUMENTS

| 6,952,779 | B1* | 10/2005 | Cohen et al. ...................... 726/22 |
| 7,013,395 | B1* | 3/2006 | Swiler et al. ...................... 726/25 |
| 7,194,769 | B2 | 3/2007 | Lippmann et al. |
| 2002/0184362 | A1* | 12/2002 | Banerjee et al. ............... 709/224 |
| 2003/0233438 | A1* | 12/2003 | Hutchinson et al. .......... 709/223 |
| 2004/0260818 | A1 | 12/2004 | Valois et al. |
| 2005/0138413 | A1* | 6/2005 | Lippmann et al. ............. 713/201 |
| 2006/0021050 | A1* | 1/2006 | Cook et al. ...................... 726/25 |
| 2006/0085858 | A1* | 4/2006 | Noel et al. ...................... 726/25 |
| 2006/0129670 | A1* | 6/2006 | Mayer ........................... 709/223 |
| 2007/0100712 | A1* | 5/2007 | Kilpatrick et al. ............... 705/29 |
| 2008/0005555 | A1* | 1/2008 | Lotem et al. ................... 713/150 |
| 2008/0141377 | A1 | 6/2008 | Dunagan et al. |
| 2010/0325412 | A1* | 12/2010 | Norrman et al. .............. 713/100 |

OTHER PUBLICATIONS

O'Hare, et al. A Graph-Theoretic Visualization Approach to Network Risk Analysis. J.R. Goodall, G. Conti, and K.-L. Ma (Eds.): VizSec 2008, LNCS 5210, pp. 60-67, 2008. http://ise.gmu.edu/~snoel/pubs/2008_VizSec.pdf. Last accessed Dec. 3, 2008, 8 pages.

Abadi, et al. An Ant Colony Optimization Algorithm for Network Vulnerability Analysis. Iranian Journal of Electrical and Electronic Engineering, vol. 2, Nos. 3&4, Jul. 2006. http://www.iust.ac.ir/ijeee/browse.php?a_code=A-10-3-17&slc_lang=en&sid=1&ftxt=1. Last accessed Dec. 3, 2008, 15 pages.

Foo, et al. ADEPTS: Adaptive Intrusion Response using Attack Graphs in an E-Commerce Environment http://cobweb.ecn.purdue.edu/~dcsl/publications/papers/2005/final_adepts_dsn05_submit.pdf. Last accessed Dec. 3, 2008, 22 pages.

(Continued)

*Primary Examiner* — Matthew Smithers
(74) *Attorney, Agent, or Firm* — Holly Nguyen; Carole Boelitz; Micky Minhas

(57) ABSTRACT

The claimed subject matter provides systems and/or methods that combat identity follow-on attacks. The system can include components for receiving a plurality of security configuration changes, selecting which of the changes included in the plurality of security changes to approve or disapprove, and based on which of the changes are approved or disapproved by an administrator, generating a further plurality of security configuration changes that the administrator can once again approve or disapprove until the administrator is satisfied with the security configuration changes.

20 Claims, 9 Drawing Sheets

(56) References Cited

OTHER PUBLICATIONS

Chawla, et al. On the Hardness of Approximating Multicut and Sparsest-Cut http://www.cs.technion.ac.il/~rabani/pss/Publications/ChawlaKKRS-CCC05-proc.pdf. Last accessed Dec. 3, 2008, 15 pages.

Nanda, et al. The Derivation and Use of a Scalable Model for Network Attack Identification and Path Prediction. Journal of Networks, vol. 3, No. 4, Apr. 2008. http://www.academypublisher.com/jnw/vol03/no04/jnw03046471.pdf. Last accessed Dec. 3, 2008, 8 pages.

Hajiaghayi, et al. An O ($\sqrt{n}$)—approximation algorithm for directed sparsest cut. Published Online Nov. 16, 2005. Information Processing Letters 97 (2006) 156-160, doi:10.1016/j.ipl.2005.10.005. http://www.sciencedirect.com/science?_ob=Mlmg&_imagekey=B6V0F-4HK5SX0-1-5&_cdi=5645&_user=3765386&_orig=search&_coverDate=02%2F28%2F2006&_sk=999029995&view=c&wchp=dGLzVlz-zSkzS&md5=684f4f396ba6d9801bf48f1aec72a22e&ie=/sdarticle.

Hajiaghayi, An O (vn)—approximation algorithm for directed sparesest cut. Published Online Nov. 16, 2005. Information Processing Letters 97 (2006) 156-160, doi:10.1016/j.ipl.2005.10.005. <<http://www.sciencedirect.com/science?_ob=Mimg&imagekey=B6V0F-4HK5SXO-1-5&_cdi=5645&_user=3765386&_orig=search&_coverDate=02%2F28%2F2006&_sk=999029995&view=c&wchp=dGLzVlz-zSkzS&md5=684f4f396ba6d9801bf48f1aec72a22e&ie=/sdarticle.

* cited by examiner

MANAGING SECURITY CONFIGURATION THROUGH MACHINE LEARNING, COMBINATORIAL OPTIMIZATION AND ATTACK GRAPHS

BACKGROUND

The past decade has witnessed a plague of remote exploits that can be launched by any machine on the Internet against any other machine with a given vulnerability. Some vulnerabilities, such as, buffer overruns or other violations of memory safety, typically result in the attacker completely compromising the remote host. Other vulnerabilities, such as SQL injection or cross-site scripting, often lead to the disclosure of personal information, though in some instances they can also lead to complete remote host compromise. To combat these attacks, a number of defensive techniques have been developed, such as; address space randomization, stack canaries, compartmentalized web browsers, self-certifying alerts, run-time dynamic dataflow analysis, and many others. Nevertheless, despite these advances, it seems unlikely that machine compromises can be completely eliminated; computer system defenders must expect that some small fraction of machines may become compromised, either due to insider attacks, social engineering, or the occasional more traditional vulnerability.

Over this period of time, computers have become ever more interconnected. Today it is not uncommon for organizations to run single-sign-on identity services for hundreds of thousands of users, while Internet identity services can support hundreds of millions of users. Furthermore, these identity services are being connected together through the use of federation technologies such as Security Assertion Markup Language (SAML). For instance, Security Assertion Markup Language (SAML) allows any application running on a commercial website that allows paying customers to rent/lease computers on which to run their own computer applications to recognize both the user alice@123.com according to 123.com and the user bob@ABC.com according to ABC.com and the application can then implement access checks involving these users.

Unfortunately, the ability to authenticate users and set access policies has far outpaced the ability to manage these security policies. In particular, the aggregate scale and complexity of these access policies have made identity follow-on attacks into pressing danger for many organizations. The term follow-on attack refers to any attack launched after an initial attack. An identity follow-on attack is one launched after an initial machine compromise, where the identities of users currently logged on to the initially compromised machine are leveraged to compromise additional machines. If the currently logged on users have administrative privileges on one or more other machines, such additional compromises can be trivial for the attacker. The attacker can even iterate this process of successive compromise.

The threat of identity follow-on attacks is that they magnify other dangers, allowing a single initial compromise to proliferate into a large number of compromised machines. Analysis of such threats in a single large organization containing several hundred thousand users and machines indicates that identity follow-on attacks allow the attacker who compromises almost any machine in the studied organization to compromise many other machines. Given the expectation that a small fraction of machines within the organization will be compromised, this can be an unacceptable situation because of the following pressures at work in the evolution of security configurations over time: granting additional privileges is frequently an easy way to enable some particular task, and there currently are no commonly used tools to analyze the impact of security configuration changes.

The subject matter as claimed is directed toward resolving or at the very least mitigating, one or all the problems elucidated above.

SUMMARY

The following presents a simplified summary in order to provide a basic understanding of some aspects of the disclosed subject matter. This summary is not an extensive overview, and it is not intended to identify key/critical elements or to delineate the scope thereof Its sole purpose is to present some concepts in a simplified form as a prelude to the more detailed description that is presented later.

While identity follow-on attacks are not prevalent at the current time, the best time for disaster prevention is before the disaster occurs. Accordingly, the claimed subject matter provides systems designed to empower information technology personnel to manage security configuration at a hitherto intractable scale. The systems provide a small number of high value security configuration changes to an information technology administrator. The information technology administrator can then identify and/or select the changes that he/she deems prudent, and what changes he/she prefers not to make. The systems can thereafter incorporate this feedback, both simulating the desired changes and/or learning the kinds of changes most acceptable to the administrator. Based at least in part on the feedback provided by the administrator, the systems can propose new sets of security configuration changes until the information technology administrator is satisfied with the plan devised to secure their organization.

The claimed matter identifies the most desirable set of configuration changes on each iteration through a combination of machine learning, combinatorial optimization, and attack graphs. Attack graphs typically capture the potential paths through which an attacker who has compromised one machine can compromise additional machines; also attack graphs can illustrate how different circumstances can cause different types of security configuration changes to be preferable. Moreover, the claimed subject matter can be employed to scalably collect the data needed to create attack graphs. Additionally, in order to identify small sets of high impact configuration changes, the claimed subject matter can apply sparsest cut, a combinatorial optimization technique related to min-cut.

Furthermore, the claimed matter can employ techniques from machine learning to identify and/or select configuration changes that are both high impact and implementable. To illustrate the complexity associated with implementability, consider a user that upgrades the software on a certain server; it can be difficult to implement a configuration change that removes the user's privileges in this situation. Due to the scale of the attack graph, it can be challenging to explicitly label the difficulty of each potential configuration change. To circumvent this obstacle, the claimed subject matter can treat the information technology administrator's decisions to accept or reject any proposed high impact configuration change as implicitly indicating the difficulty of implementing the configuration change. Machine learning can be employed to generalize from this implicit feedback and re-estimate the difficulty of other potential configuration changes. These revised estimates can thereafter be utilized in future iterations to identify and/or select configuration changes that are both high impact and implementable by the information technology administrator.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
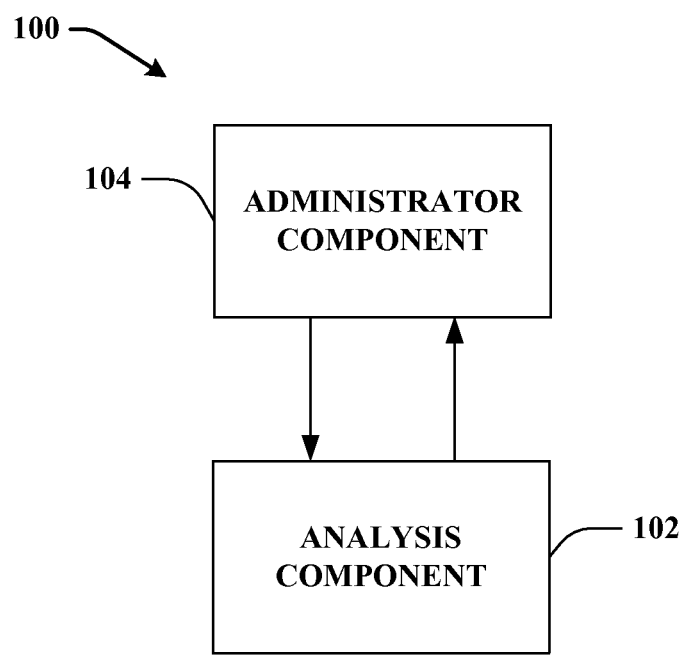
FIG. 1 illustrates a machine implemented system that combats identity follow-on attacks through use of machine learning, combinatorial optimization and/or attack graphs in accordance with an aspect of the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

It is typical for modern identity services to entrust a computer with the authority to make requests on behalf of an authenticated user. Once this trust has been granted, it is available to an attacker if the machine is compromised. To illustrate the mechanics of the foregoing vulnerability consider the following illustration, utilizing Kerberos to provide network authentication, where a user A provides his/her machine with a secret, such as a password, a smartcard certificate, or even a biometric proof like a fingerprint or iris scan. User A's machine can utilize this secret to obtain a Ticket Granting Ticket (TGT) from a Key Distribution Center (KDC)—the Ticket Granting Ticket (TGT) grants user A's machine the right to perform actions on user A's behalf. On receipt of the Ticket Granting Ticket (TGT) from the Key Distribution Center (KDC) user A's machine can persist the Ticket Granting Ticket (TGT) locally, avoiding the need to repeatedly ask user A for his/her secret. The persisted Ticket Granting Ticket (TGT) can then be presented to the Key Distribution Center (KDC) in order to obtain a Service Ticket (ST) which user A's machine can present to User B's machine as part of a request on user A's behalf (e.g., to write a file on user B's machine marked "writable by user A"). The Service Ticket (ST) proves to user B's machine that user A's machine has authority to perform actions on user A's behalf. Cryptographic techniques in Kerberos prevent user B's machine from subsequently utilizing the Service Ticket (ST) from user A's machine to convince other machines that it (e.g., user B or user B's machine) has authority to perform actions on user A's behalf.

In an identity follow-on attack in the foregoing scenario, an attacker can compromise user A's machine. How the attacker facilitates the attack is not germane to the claimed subject matter, which is directed for the most part to bounding the consequent damage. If user A is already logged on to his/her machine, or if user A arrives at work and logs on, the Ticket Granting Ticket (TGT) being stored locally on user A's machine can be employed by the attacker to obtain or generate Service Tickets (STs) at will. With the ability to utilize the Ticket Granting Ticket (TGT) persisted on user A's machine to obtain or generate Service Tickets (STs) at will, the attacker can attempt to compromise every machine where user A has administrative privileges. A great variety of techniques are possible at this point because, by design, user A has privileges that allow him/her to arbitrarily modify these machines. For instance, to find machines where user A might have administrator privileges, the attacker can scan all of user A's email for machine names, scan computer files employed to store information on where to find nodes (e.g., machines) on a network, examine local broadcast traffic, or monitor outgoing and/or incoming Transmission Control Protocol (TCP) connections. To perform actions with user A's Service Ticket (ST), the attacker can read user A's Ticket Granting Ticket (TGT) out of memory, initiate a new process under user A's login session, or modify the parameters in system calls before the call is executed by the Operating System (OS) on user A's behalf The actions performed with user A's Service Ticket (ST) can include attempting to write security critical files or registry keys, installing new applications, or configuring one or more system services insecurely so that they become backdoors to these other systems or the network in general. Accordingly, in view of the many techniques available, it is not safe to assume that an attacker will have difficulty exploiting additional machines wherein the attacker merely repeats the process actuated on user A's machine by scanning newly compromised machines for Ticket Granting Tickets (TGTs), lying in wait for additional users to logon whereupon the attacker can use these new identities to compromise still more machines.

There are many different reasons why networks of machines as a whole are insecure. For example, an organization may have grown over time without ever dividing responsibility for machine organization among a small number of individuals; every time a permission problem was suspected as a cause of any bug (e.g., correctly or incorrectly), a user was given more privileges somewhere; every time some job needed to be run on a series of machines, a privileged account was configured to automatically log into those machines; or a user may have needed different privileges over the course of several different roles within an organization and never had any of those old privileges removed, to enumerate but a few of the many reasons.

Because such insecure configuration can have many causes, securing the configuration can require different strategies in different circumstances. For instance, consider an identity that logs in to one or more places, that has privileges in several other places and where it is decided that current configuration presents an unacceptable security risk. Since there can be different strategies used under different circumstances, the claimed matter can employ one or more heuristics to accomplish its ends.

Accordingly, suppose an account logs into many different machines. The compromise of any one of these machines allows the compromise of the account, but this may or may not represent a security risk. If the account has no administrator privileges, the compromising of the account likely presents no threat to any other machine: this scenario can be the case for an underprivileged service account, for example, the identity associated with a log uploading agent that can run on every user's machine. If the account has been mistakenly granted administrator privileges in a few places, it is unlikely these are necessary for its proper functioning, since it is running without administrator privileges on every other machine.

On the other hand, if the account has administrator privileges everywhere, it is much more likely that it needs these administrator privileges to accomplish its basic task. In this case, it can be a difficult task to eliminate the need for the account to have administrator privileges. However, it is typically a relatively trivial code change for an account to exercise its administrator privileges on a given machine without logging in. For example, suppose some account A has administrator privileges on a machine M and logs into M to execute some code. Instead, account A can present its Service Ticket (ST) to a machine M, and request machine M to create a local account L with administrator privileges where only account A knows local account L's password, log in as account L, execute the code on machine M it needs to run, log out, and then account A can ask machine M to delete local account L, again just using account A's service ticket. This approach is straightforward and allows account A to accomplish its goal without ever allow machine M to have account A's Ticket Granting Ticket (TGT).

As an example of why different kinds of mitigations are appropriate in different circumstances, suppose that an account has administrator privileges on a large number of machines where it never logs in. These may be needed because the privileges are there for critical emergency use, or the administrator privileges may be completely unnecessary, perhaps dating back to when the user had a different role in the organization.

The context informing which approach to take in reducing the impact of an attack can be very hard for an analysis tool to understand without human involvement. Accordingly, the claimed subject matter focuses on empowering system administrators through more powerful analysis, rather than trying to make the decisions for the system administrator.

While one might hope that there were some simple invariant that any good security configuration should possess and which a configuration management system could trivially enforce, attacks leveraging identity are fundamentally difficult to defend against because there is no such general invariant. For instance, system administrators in an enterprise setting can be given privileges so that they can perform common administrative tasks, such as creating or removing accounts when a user joins or leaves an organization. The system administrators' privileges can represent an attack surface that can be reduced, perhaps by dividing responsibility for computer administration at a finer granularity, or it may simply present an acceptable risk. These judgments are inherently specific to the circumstances of each organization and the people involved.

Because of the subtly different circumstances and tradeoffs surrounding each security configuration change, a fundamentally different approach is needed to manage security configuration. Humans nevertheless must be involved in the loop of analyzing security configurations and determining the appropriate change for any given set of circumstances.

FIG. 1 illustrates a machine implemented system 100 that combats identity follow-on attacks through use of machine learning, combinatorial optimization and/or attack graphs in accordance with an aspect of the claimed subject matter. As illustrated system 100 can include analysis component 102 that is designed to empower information technology administrators (e.g., through use of administrator component 104) to manage security configuration. Analysis component 102 can present to information technology administrators using administrator component 104 a small number of high value security configuration changes. The information technology administrator then utilizing administrator component 104 can choose or select the changes that they deem most appropriate given their particular working environment as well as those changes that they prefer not to make. Analysis component 102 can then take the feedback from administrator component 104 and can simulate the desired changes and learn the kinds of changes most acceptable to an information technology administrator. This process of presenting a small number of high value security configuration changes to the information technology manager, receiving the information technology manager's feedback with regard to changes that are appropriate and those that are not suitable, simulating the desired changes, learning the changes that are most acceptable to an information technology manager, and thereafter proposing new sets of security configuration changes can be repeated until the information technology administrator is satisfied with the security plan developed for their organization.

Analysis component 102 can identify the most desirable set of configuration changes on each iteration through a combination of machine learning, combinatorial optimization and/or attack graphs. As has been stated above, attack graphs typically capture the potential paths through which an attacker who has compromised one machine can compromise additional machines. Additionally, attack graphs can illustrate how different circumstances can cause different types of security configuration changes to be preferable. Further, analysis component 102 can scalably collect the necessary data to create the attack graphs and perform a sparsest cut operation on the developed attack graphs to identify small sets of high impact configurations changes to present to the information technology administrator. Moreover, analysis component 102 can utilize techniques from machine learning to select configuration changes that are both high impact and implementable.

As depicted, analysis component 102 can, via a network topology and/or cloud, be in continuous and/or operative or sporadic and/or intermittent communication with administrator component 104. Analysis component 102 can be implemented entirely in hardware and/or a combination of hardware and/or software in execution. Further, analysis component 102 can be incorporated within and/or associated with other compatible components. Additionally, analysis component 102 can be, but is not limited to, any type of machine that includes a processor and/or is capable of effective communication with a network topology and/or cloud. Illustrative machines that can comprise analysis component 102 can include desktop computers, server class computing devices, cell phones, smart phones, laptop computers, notebook computers, Tablet PCs, consumer and/or industrial devices and/or appliances, hand-held devices, personal digital assistants, multimedia Internet mobile phones, multimedia players, and the like.

Moreover while the network topology and/or cloud is not specifically depicted those reasonably cognizant in this field of endeavor will recognize that such a network topology and/or cloud can include any viable communication and/or broadcast technology, for example, wired and/or wireless modalities and/or technologies can be utilized to effectuate the claimed subject matter. Moreover, the network topology and/or cloud can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and/or distributed—and/or any combination, permutation, and/or aggregation thereof. Additionally, the network topology and/or cloud can include or encompass communications or interchange utilizing Near-Field Communications (NFC) and/or communications utilizing electrical conductance through the human skin, for example.

Additionally as depicted, system 100 can include administrator component 104 that can be utilized by information technology administrators to provide feedback to analysis component 102 in the form of approval or disapproval of the security configuration changes that have been developed or generated by analysis component 102. Administrator component 104 can be, but is not limited to, any type of engine, machine, instrument of conversion, or mode of production that includes a processor and/or is capable of effective and/or operative communications with the network topology and/or cloud. Illustrative instruments of conversion, modes of production, engines, mechanisms, devices, and/or machinery that can comprise and/or embody administrator component 104 can include desktop computers, server class computing devices and/or databases, cell phones, smart phones, laptop computers, notebook computers, Tablet PCs, consumer and/or industrial devices and/or appliances and/or processes, hand-held devices, personal digital assistants, multimedia Internet enabled mobile phones, multimedia players, and the like.

Figure 2:
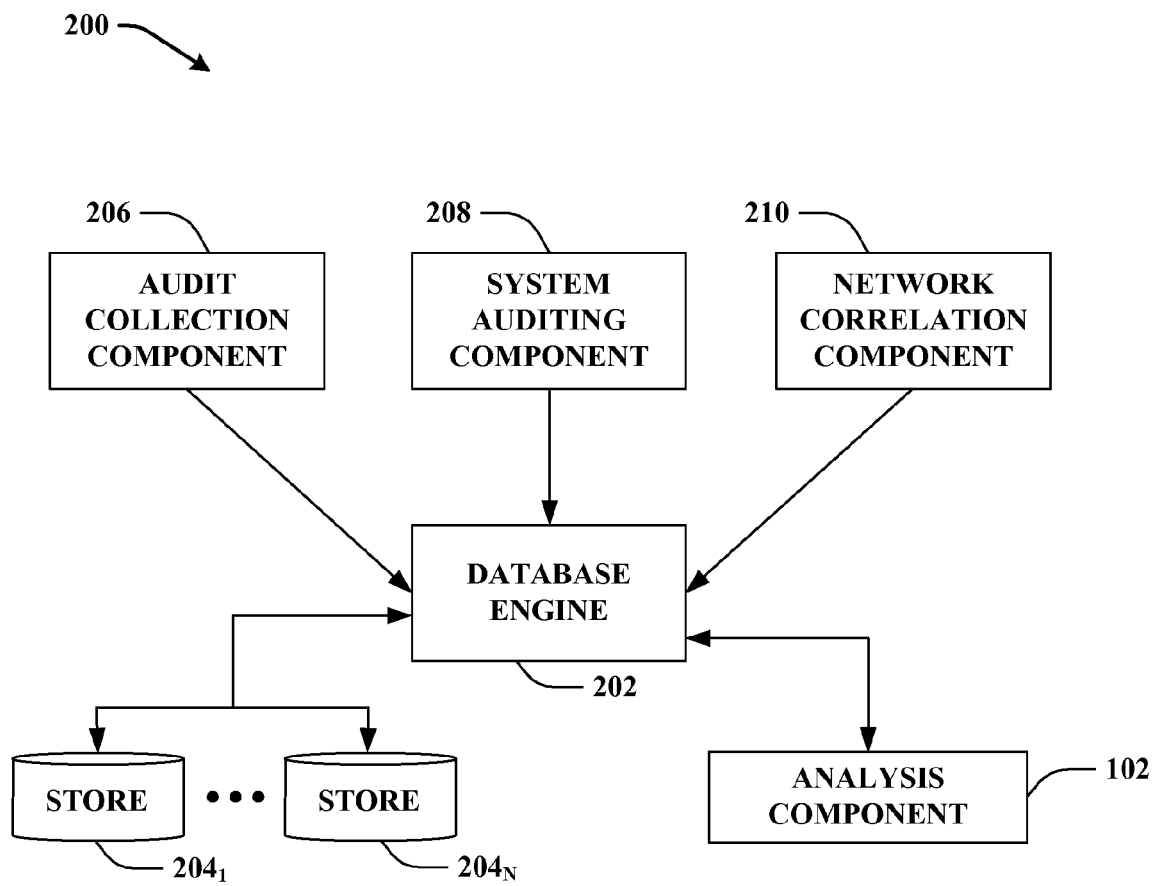
FIG. 2 depicts a further machine implemented system that combats identity follow-on attacks by collecting data needed for the analysis of potential identity follow-on attacks.

FIG. 2 provides further depiction of a machine implemented system 200 that combats identity follow-on attacks by collecting data needed for the analysis of potential identity follow-on attacks. As depicted system 200 illustrates how analysis component 102 can integrate within a more encompassing system of components for collecting the data needed to create the attack graphs that it utilizes to generate and find small sets of high impact and implementable configuration changes. Accordingly, system 200 can include database engine 202 that can be implemented entirely in hardware and/or as a combination of hardware and/or software in execution. Database engine 202 can be in continuous and/or operative or sporadic and/or intermittent communication with analysis component 102, and can be utilized to create, retrieve, update and/or delete data from associated storage aspects $204_1, \ldots, 204_N$, where N is an integer equal to or greater than 1. For instance and as depicted, database engine 202 can acquire data from audit collection component 206, system auditing component 208, and/or network correlation component 201, and thereafter persist such data to storage aspects $204_1, \ldots, 204_N$. The data persisted to storage aspects $204_1, \ldots, 204_N$, through database engine 202, can be retrieved, supplied, or acquired by analysis component 102 for further analysis and/or processing. As will be appreciated by those of reasonable skill in the art, storage aspects $204_1, \ldots, 204_N$, can include any suitable data necessary for analysis component 102 to facilitate its aims.

It is to be appreciated that storage aspects $204_1, \ldots, 204_N$ can be, for example, volatile memory or non-volatile memory, or can include both volatile and non-volatile memory. By way of illustration, and not limitation, non-volatile memory can include read-only memory (ROM), programmable read only memory (PROM), electrically programmable read only memory (EPROM), electrically erasable programmable read only memory (EEPROM), or flash memory. Volatile memory can include random access memory (RAM), which can act as external cache memory. By way of illustration rather than limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink® DRAM (SLDRAM), Rambus® direct RAM (RDRAM), direct Rambus® dynamic RAM (DRDRAM) and Rambus® dynamic RAM (RDRAM). The storage aspects $204_1, \ldots, 204_N$ of the subject systems and methods is intended to comprise, without being limited to, these and any other suitable types of memory. In addition, it is to be appreciated that storage aspects $204_1, \ldots, 204_N$ can be a server, a database, a hard drive, and the like.

In addition to analysis component 102, database engine 202, and associated storage aspects $204_1, \ldots, 204_N$ for the creation, integration, retrieval, update and deletion of data, system 200 can include audit collection component 206, system auditing component 208, and network correlation component 210, each of which can provide source data for consumption by analysis component 102. Audit collection component 206 can collect event information from a variety of network services, such as a Kerberos Key Distribution Center (KDC) in addition to other functions. These events can include all granting to Ticket Granting Tickets (TGTs) and Service Tickets (STs) over a given period of time. The Ticket Granting Ticket (TGT) and Service Ticket (ST) events can include the Internet Protocol (IP) address of the machine, the name of the account for which the ticket was granted, and the time at which the grant was made.

System auditing component 208 can scan all machines within the organizational intranet and report back the set of accounts and security groups that have administrative privileges on that machine. These logs can include the Media Access Control (MAC) address, machine name, and the time at which the scan was performed.

Network correlation component 210 can collect Address Resolution Protocol (ARP) logs. The Address Resolution Protocol (ARP) logs allow the Internet Protocol (IP) addresses in audit collection component 206 logs to be correlated with the Media Access Control (MAC) addresses and machine names in system auditing component 208 logs.

While audit collection component 206, system auditing component 208, and network correlation component 210 can form a data collection system that collectively represent multiple man-years of software engineering effort, and each have separately been through validation steps to assure the accuracy of the data being collected, there are four places where inaccurate inferences might arise in the collection architecture. First, the correlation from Media Access Control address to Internet Protocol (IP) address can be incorrect if the common network time service being used is failing to appropriately synchronize. Second, the membership in the administrators group is polled periodically, and so may not always reflect very recent additions or deletions. Third, the resolution of security group membership to accounts is done when data is inserted into the database (e.g., database engine 202 and its associated storage aspects $204_1, \ldots, 204_N$), and it too can change over time. Fourth, individual machines can have multiple Media Access Control (MAC) address to obtain their Ticket Granting Ticket (TGT) while only ever being audited by the audit collection component 206 over one particular Media Access Control (MAC) address.

Assessment as to whether or not these inaccurate inferences impinge on the accuracy of overall system however indicates that the system is not subject to such inaccuracies since network time synchronization with single organizations are typically quite accurate; membership in the administrators group is generally static for modest periods of time (e.g., weeks); membership in security groups is similarly static; and client machines tend to be connected to the network using only one Media Access Control (MAC) address at a time.

Figure 3:
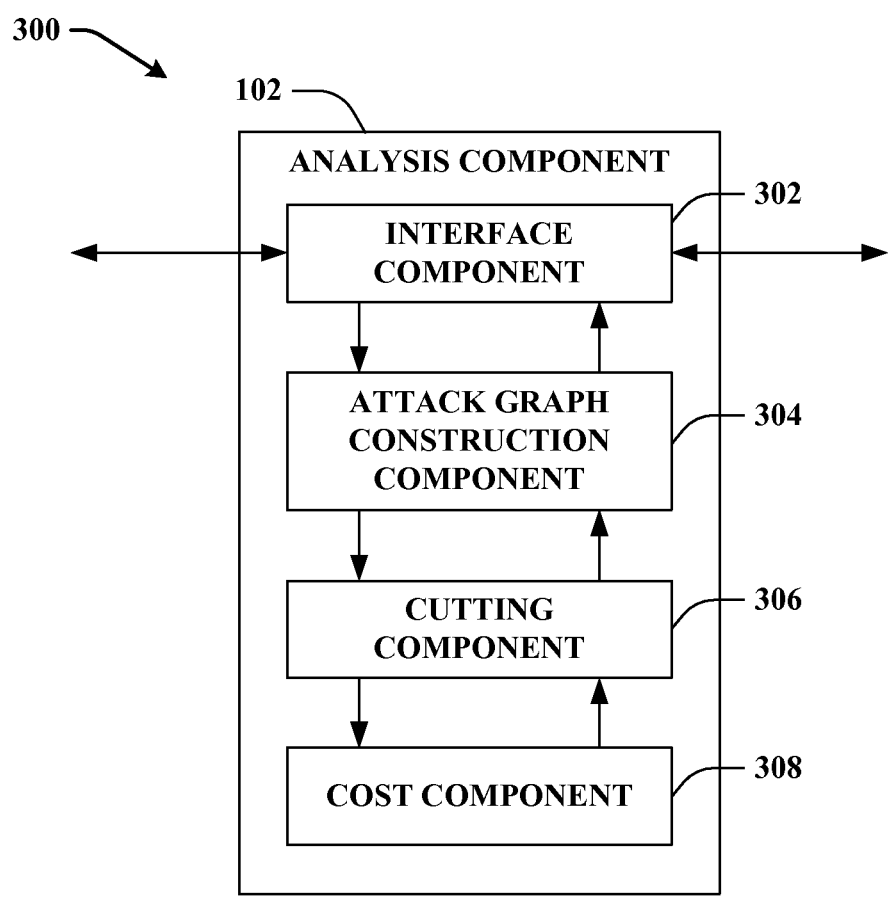
FIG. 3 provides a more detailed depiction of an illustrative analysis component that combats identity follow-on attacks through use of machine learning, combinatorial optimization and/or attack graphs in accordance with an aspect of the claimed subject matter.

FIG. 3 provides a more detailed illustration 300 of analysis component 102 in accordance with an aspect of the claimed subject matter. As depicted analysis component 102 can include interface component 302 (hereinafter referred to as "interface 302") that can receive feedback from administer component 104 in the form of approval and/or disapproval regarding security configuration changes proposed by analysis component 102 (or more particularly, the other constituent components included in analysis component 102) or can supply or disseminate the security configuration changes generated by analysis component 102.

Interface 302 can provide various adapters, connectors, channels, communication pathways and/or modalities, etc. to integrate analysis component 102 into virtually any operating and/or database system(s) and/or with one another. Additionally, interface 302 can provide various adapters, connectors, channels, communication pathways and/or methodologies, etc. to effectuate and facilitate interaction with and between the various other components that can be included within analysis component 102 (e.g., attack graph construction component 304, cutting component 306, and cost component 308), and/or any other component, data, and the like associated with system 300.

Analysis component 102 can also include attack graph construction component 304 that constructs attack graphs by identifying accounts, machines, and security groups from the data supplied by one or more of audit collection component 206, system auditing component 208, and network correlation component 210. The accounts, machines, and security groups can become nodes in the attack graph wherein each node can be connected by an edge that represents a control relationship. If an account logs in to a machine, an edge directed from the machine to the account represents that the machine can perform actions on behalf of the account. Moreover, an account or security group that has administrator privileges on a machine can be represented as an edge pointing from the account or security group to the machine; the direction of the edge again represents a control relationship. Additionally, an account belonging to a security group can also be represented by an edge from the account to the security group.

Figure 6:
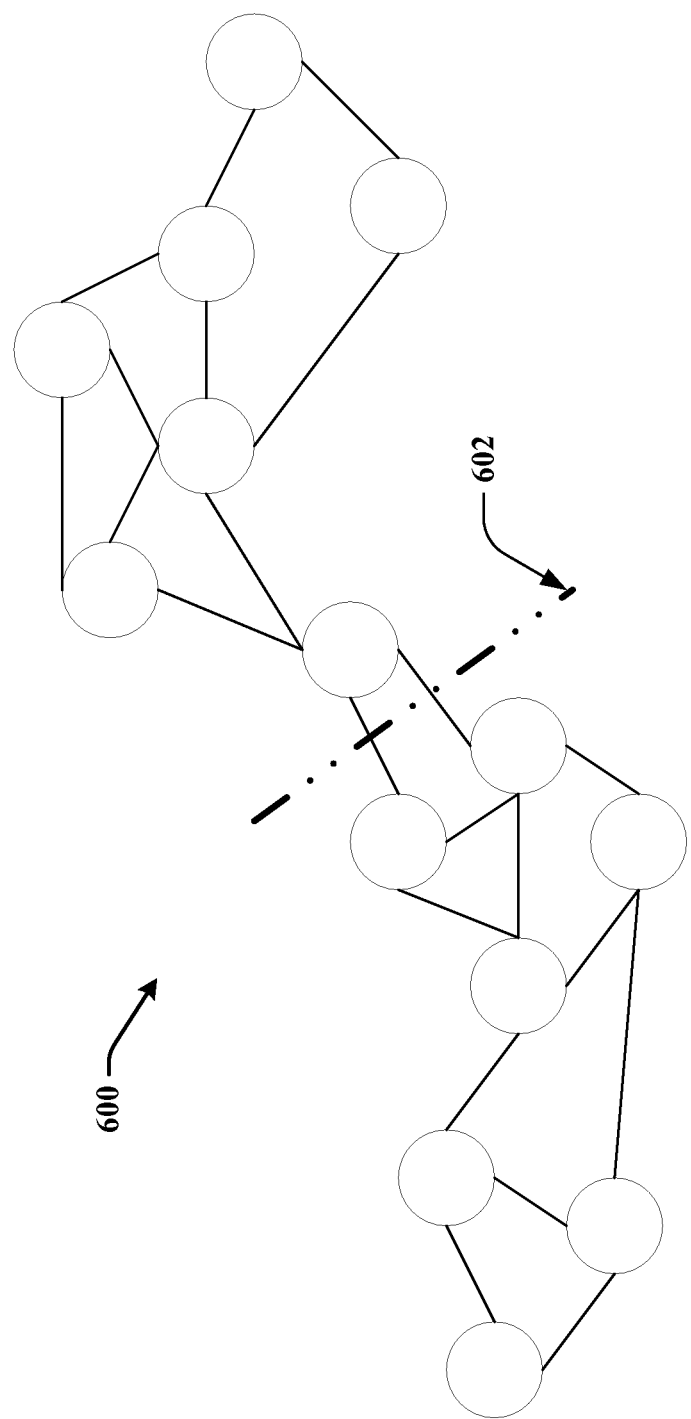
FIG. 6 provides depiction of an attack graph undergoing a sparsest cut in accordance with an aspect of the subject matter as claimed.

Because attack graphs can be massive (e.g., hundreds of thousands of nodes and millions of edges), information technology administrators can need assistance in identifying configuration changes that offer the greatest increase in system-wide security. To find these high-value configuration changes, analysis component 102 models the task as an instance of sparsest cut. Sparsest cut finds the smallest set of edges in an attack graph whose removal prevents any compromise among some large set of machines (this is visually depicted in FIG. 6 as 602). Accordingly, analysis component 102 can include cutting component 306 that can repeatedly identify edge sets to remove. Cutting component 306 can find the smallest set of edges whose removal separates a graph into two large sets of nodes, wherein edge removal equates to configuration changes and separating the graph into two large sets represents preventing compromise of a machine in one set from leading to compromise (directly or indirectly) of any machine in the other set. Cutting component 306 by utilizing a sparsest cut algorithm on an attack graph, produces to present to an information technology administrator the smallest set of configuration changes that will do the most to improve the security of the system.

To define the directed sparsest cut problem precisely the following notation can be employed. The inputs are the vertex set V, the edge set E, the edge costs c(e), and the demand set dem(i). $P_{uv}$ is a derived variable referring to the set of paths connecting u to v. The output of the optimization is a set of edge distances d(e) which can be a fractional approximation to whether the edges should be cut in an optimal sparsest cut with values close to 1 indicating that the edge should definitely be cut, and values close to 0 indicating that the edge should not be cut.

$$\text{minimize} \sum_{e \in E} c(e) d(e)$$

$$\text{subject to } \sum_{e \in p_{uv}} d(e) \geq x(u, v)$$

$$\forall (u, v) \in V \times V, \forall p_{uv} \in P_{uv}$$

$$\sum_i x(s_i, t_i) \cdot dem(i) = 1$$

$$d(e) \geq 0, x(u, v) \geq 0$$

Since accounts, machines, and security groups all become nodes in the attack graph, an account logging in to a machine causes an edge to be created pointing from the machine to the account; the edge represents a control relationship, as the machine can perform actions on behalf of the account. An account or security group having administrative privileges on a machine is represented as an edge pointing from the account or security group to the machine; the direction of the edge again represents the control relationship. An account belonging to a security group is represented as an edge from the account to the security group. Security groups can be nested hierarchically, but it has been found for purposes of analysis it can be more convenient to expand out membership of accounts in security groups such that there are no edges from one security group to another security group in the attack graph. Moreover, initially the edge cost can be set to 0.5, for example, but these edge costs are changed as will be described infra.

A large body of work in theoretical computer science has been devoted to efficiently computing approximate solutions to approximate sparsest cut optimization; the optimization problem can be expressed in the following form that is more amenable to approximate optimization.

$$\text{minimize } \ln\frac{\beta}{\gamma}$$

$$\beta = \sum_{e \in E} c(e)d(e)$$

$$\gamma = \sum x(s_i, t_i) \cdot dem(i)$$

$$\text{subject to } \sum_{e \in p_{uv}} d(e) \geq x(u, v)$$

$$\forall (u, v) \in V \times V, \forall p_{uv} \in P_{uv}$$

$$d(e) \geq 0, x(u, v) \geq 0$$

A common approach on approximate sparsest cut optimization is to begin with an initial uniform assignment of edge distances, and then to iteratively refine this assignment. In each round of iterative refinement, the shortest path is computed for every set of demand pairs, and this is used both to calculate $x(s_i, t_i)$, the distance between $s_i$ and $t_i$ as a result of the current distances, as well as the contribution of every edge distance $d(e)$ to $\gamma$ (which is essentially the number of shortest paths it appears on). The final step of the iterative round is to use these computations to perform some form of gradient descent, where the step size is bounded so as to not cause any of the $d(e)$ to become negative.

The approach employed by cutting component 306 is a modification of the foregoing common approach for at least the following four reasons. First, since the optimization is generally designed for interactive use it cannot run for hours, even on an attack graph with almost half a million vertices. Second, the actual value of the optimization is not as important as the relative distances assigned to the edges: edges that cause many accounts to be able to compromise many machines are very bad, and as long as they get assigned longer distances that the relatively harmless edges, the exact value of the objective function is not of paramount importance. To deal with goals, cutting component 306 can use a simple change of variables that makes the problem non-linear but eliminates the need to bound the step size. Because this operation is within a gradient descent, the change to a non-linear formulation does not present other problems for the solver. The particular variables that appear to work the best are:

$$d(e) = \begin{cases} u(e) & \text{if } u(e) > 1 \\ e^{u(e)-1} & \text{if } u(e) \leq 1 \end{cases}$$

The third reason being that cutting component 306 needs to be able to accommodate degeneracies gracefully: if there are two shortest paths between a given pair of demand nodes, cutting component 306 cannot ping pong back and forth between identifying one and identifying the other on alternate iterations because it cannot afford the requisite number of iterations needed for convergence. Rather cutting component 306 perturbs each edge distance by a small random multiplicative factor (e.g., between 0.95 and 1.05) on each shortest path computation.

The fourth reason that there needs to be a modified approach is that cutting component 306 cannot afford to compute all the shortest paths. Accordingly, random sampling can be employed wherein at each iteration cutting component 306 can choose a small number of nodes, and for each node, cutting component 306 can conduct a bread-first search until the horizon of the search includes a certain number of nodes.

Certain edges in the constructed attack graph can correspond to operations practices that are difficult to change, such as a user needing to log on to their desktop. Other edges can be trivial to remove, such as an administrative privilege that is no longer needed because the user has changed to a new role within the organization. The sparsest cut algorithm employed by cutting component 306 can incorporate such differences in the cost of removing different edges. However, these edge costs are part of the input, and the number of edges in the attack graph can make it infeasible to set all their costs manually. Accordingly, analysis component 102 can also include cost component 308 that relies on feedback from information technology administrators about their willingness to make a security configuration change as implicitly indicating relative edge costs. If an edge is marked as worth keeping, its estimated cost should have been higher, while if an edge is marked as worth cutting, it estimated cost was either accurate or should have been lower. Thus, cost component 308 can employ machine learning instrumentalities to generalize from the feedback on individual edges to re-estimate the costs of all edges on every iteration. In this way, analysis component 102 (and in particular cost component 308) learns over time to propose primarily configuration changes that the administrator is interested in implementing. This learning approach has the advantage that the recommendations are tailored to each organization, and no a priori assumptions are required about any given usage pattern being correlated with edge cost (e.g., whether or not a mostly unused administrative privilege must be kept around for unusual events).

Cost component 308 then operates by computing a set of edges that it thinks the system administrator is most likely to want to cut and then presents these edges to the system administrator. The system administrator labels some of them as edges that should be cut, and others as edges that should not be cut. Cost component 308 modifies the graph according to the feedback from the system administrator (removing edges designated to be cut) and then determines a new set of edges to present to the system administrator. The new set of edges can be ascertained not just by running the same algorithm on the new graph, but also by using the system administrator's previous judgments as implicitly defining the system administrator's preferences for cutting and keeping different kinds of edges.

To incorporate the system administrator's feedback, cost component 308 can treat the hidden variable in the optimization as the cost of an edge, and it can define a set of features and constraints from which it learns the best approximation to the cost function. The set of features can be 12 basic graph properties of each edge: the number of accounts, security groups and machines pointing in to the start node of the edge, the number of same nodes that the start node points to, and the same features for the end node of the edge. The edge cost function can be modeled as a linear function of these features.

The constraints can be derived from the system administrator's feedback. For every edge that is marked as "should be cut", cost component 308 can create a constraint that this edge's cost is less than the benefit of cutting this edge. For every edge that is marked as "should be kept", cost component 308 can create a constraint that this edge's cost is greater than the benefit of cutting this edge. Because cut edges disappear from the graph after this one iteration, their features are frozen at the values when the edge was cut. Because kept edges are present in later iterations of the graph, the values for their features are updated in every subsequent iteration.

Given the set of features, the model for the cost function, and the constraint set, cost component 308 can optimize the particular cost function to find the particular linear weights on the features that best satisfy all the constraints. The optimization technique that can be utilized by cost component 308 can be the Support Vector Machine (SVM) framework, for example, with the minor modification of applying the logistic loss instead of the hinge loss for penalizing violated constraints where the logistic loss is a differentiable approximation of the hinge loss.

Figure 4:
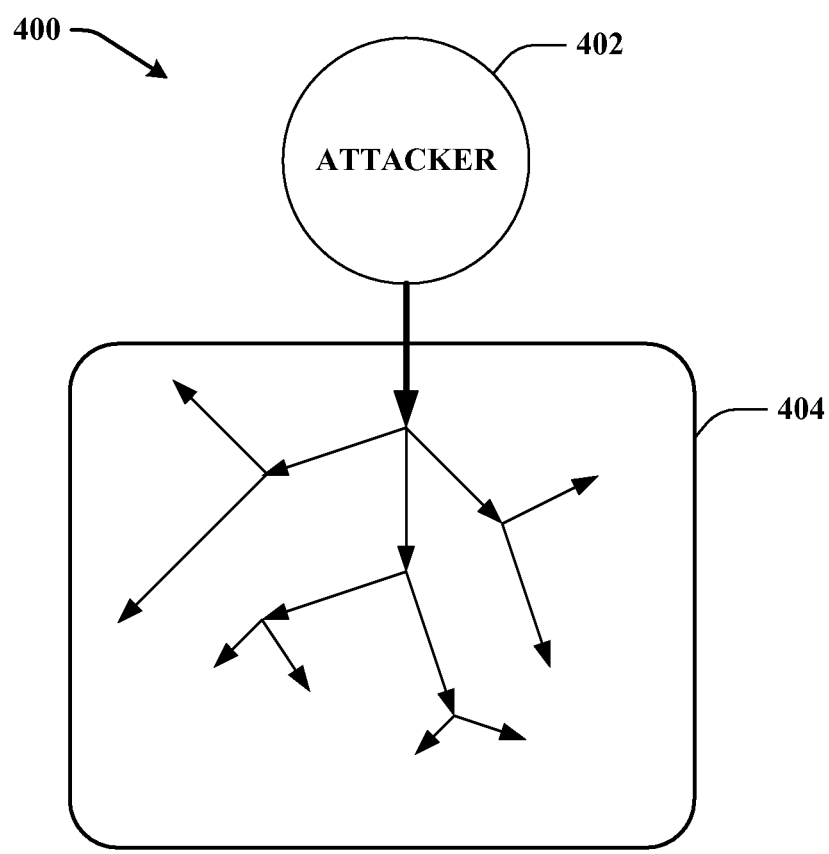
FIGS. 4 and 5 illustrate comparatively how the claimed subject matter contains the damage from identity follow-on attacks in accordance with an aspect of the claimed subject mater.
Figure 5:
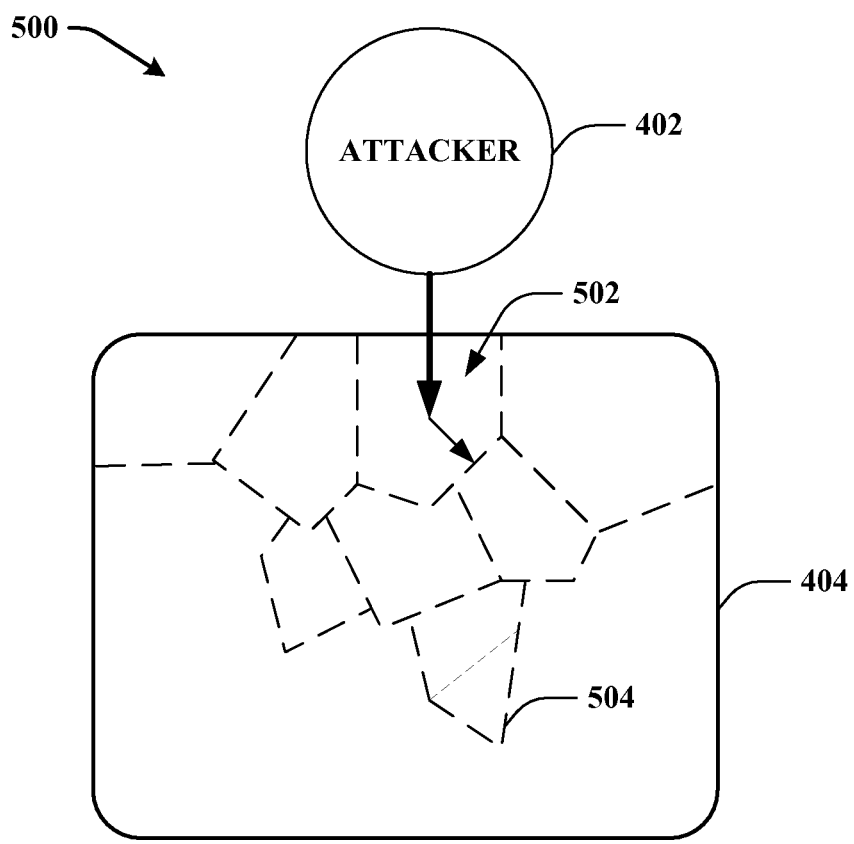

FIGS. 4 and 5 illustrate comparatively how the claimed subject matter contains the damage from identity follow-on attacks. As illustrated in FIG. 4, an attacker 402 gains entry into vulnerable network 404 by compromising a first machine. If the user of the first machine is already logged on, or if the user of the first machine subsequently arrives at work and logs on and a Ticket Granting Ticket (TGT) is stored somewhere on the first machine, attacker 402 can utilize the Ticket Granting Ticket (TGT) to generate Service Tickets (STs) at will.

Attacker 402 can then attempt to compromise every machine where the first user has administrative privileges. A great variety of techniques are possible because by design the first user has privileges that allow him/her to arbitrarily modify these further machines. Attacker 402 having compromised every machine where the first user has administrative privileges can repeat the process and scan newly compromised machines for Ticket Granting Tickets (TGTs) perhaps lying in wait for additional users to logon, and using these new identities to compromise still more machines.

FIG. 5 illustrates the security configuration after the claimed subject matter has been employed to identify desirable security configuration changes wherein the attacker 402 has once again gained entry into network 404 by compromising a first machine. However, in contrast to the situation illustrated in FIG. 4, attacker 404 can go no further than the first machine 502 since the information technology administrator of network 402 has implemented a set of security configuration changes that have essentially partitioned network 404 so that identity follow on attacks can be negated.

Figure 7:
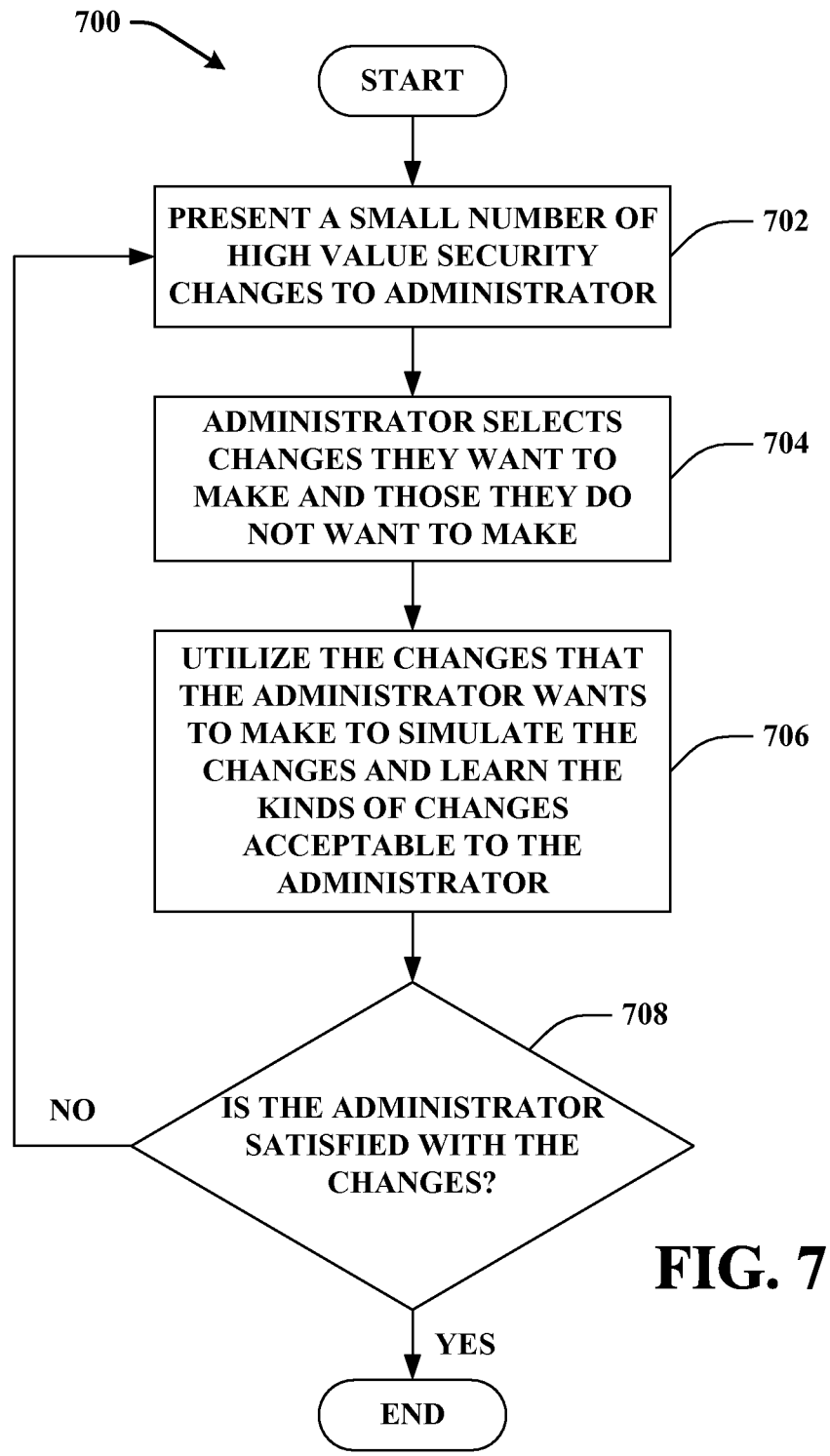
FIG. 7 illustrates a flow diagram of a machine implemented methodology that combats identity follow-on attacks through use of machine learning, combinatorial optimization and/or attack graphs in accordance with an aspect of the claimed subject matter.

In view of the illustrative systems shown and described supra, methodologies that may be implemented in accordance with the disclosed subject matter will be better appreciated with reference to the flow chart of FIG. 7. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 7 depicts a machine implemented methodology 700 that combats identity follow-on attacks through use of machine learning, combinatorial optimization and/or attack graphs in accordance with an aspect of the claimed subject matter. Method 700 can commence at 702 where a small number of high value security configuration changes can be presented to an information technology administrator. At 704 the information technology administrator can then identify and/or select the changes that he/she deems prudent, and what changes he/she prefers not to make. At 706 this feedback can be employed both to simulating the desired changes and/or to learn the kinds of changes most acceptable to the administrator. At 708 a query can be posited as to whether or not the administrator is satisfied with the changes. If the answer at 708 is affirmative (e.g., YES) method 700 can terminate. If however the answer at 708 is negative (e.g., NO) method 700 can cycle back to 702 where new sets of security configuration changes can be proposed until the information technology administrator is satisfied with the plan devised to secure their organization.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 8:
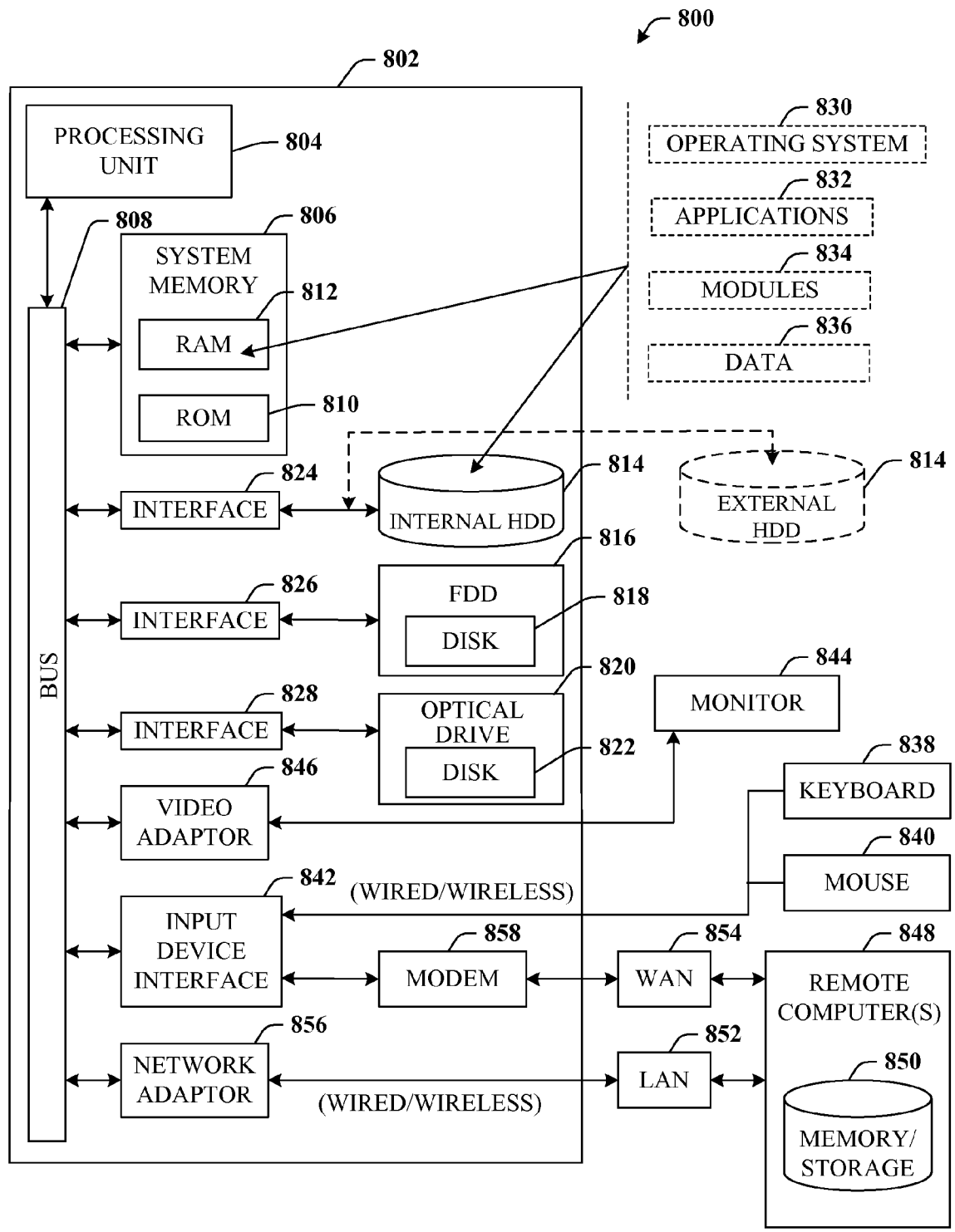
FIG. 8 illustrates a block diagram of a computer operable to execute the disclosed system in accordance with an aspect of the claimed subject matter.

Referring now to FIG. 8, there is illustrated a block diagram of a computer operable to execute the disclosed system. In order to provide additional context for various aspects thereof, FIG. 8 and the following discussion are intended to provide a brief, general description of a suitable computing environment 800 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the illustrative environment 800 for implementing various aspects includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1094 interface technologies. Other external drive connection technologies are within contemplation of the claimed subject matter.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the methods of the disclosed and claimed subject matter.

A number of program modules can be stored in the drives and RAM 812, including an operating system 830, one or more application programs 832, other program modules 834 and program data 836. All or portions of the operating system, applications, modules, and/or data can also be cached in the RAM 812. It is to be appreciated that the claimed subject matter can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1094 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are illustrative and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10 BaseT wired Ethernet networks used in many offices.

Figure 9:
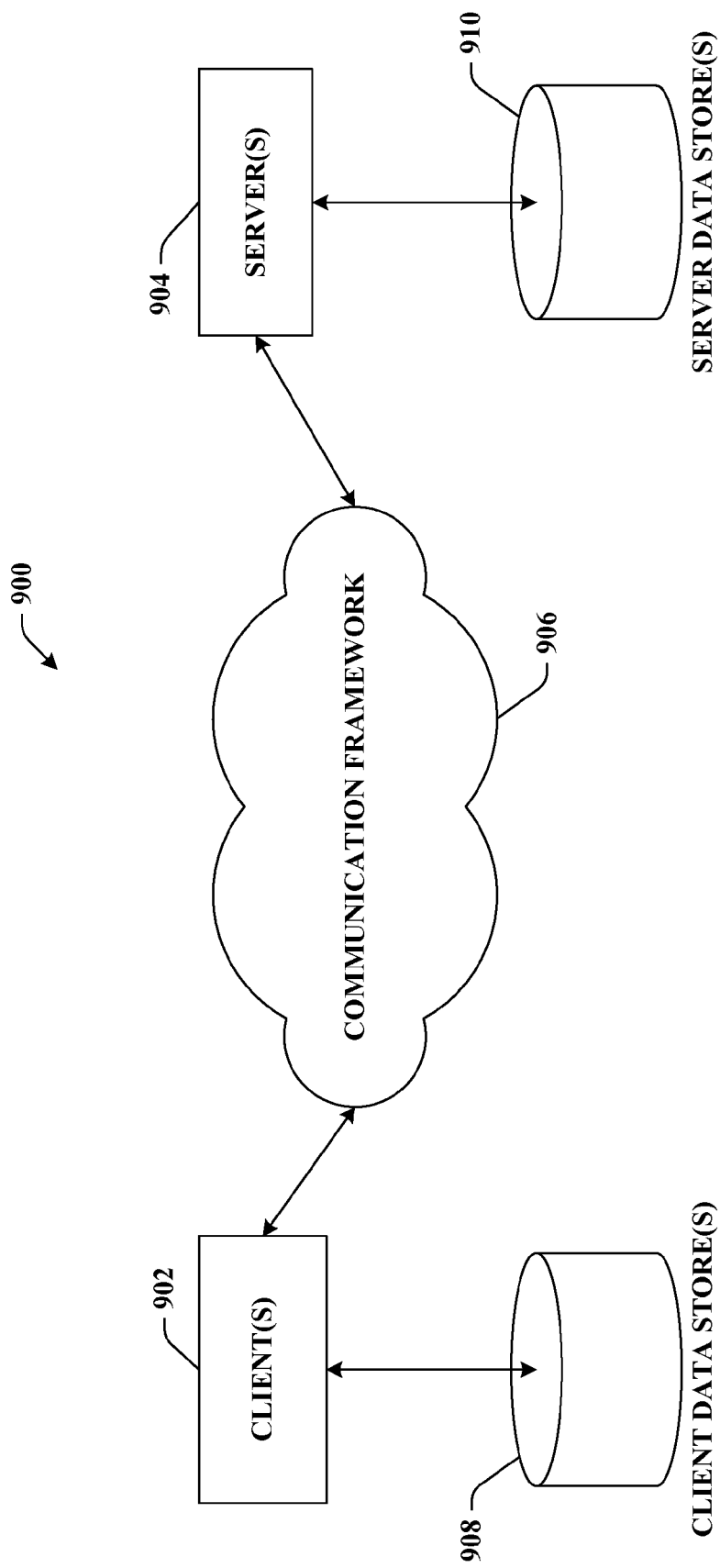
FIG. 9 illustrates a schematic block diagram of an illustrative computing environment for processing the disclosed architecture in accordance with another aspect.

Referring now to FIG. 9, there is illustrated a schematic block diagram of an illustrative computing environment 900 for processing the disclosed architecture in accordance with another aspect. The system 900 includes one or more client(s) 902. The client(s) 902 can be hardware and/or software (e.g., threads, processes, computing devices). The client(s) 902 can house cookie(s) and/or associated contextual information by employing the claimed subject matter, for example.

The system 900 also includes one or more server(s) 904. The server(s) 904 can also be hardware and/or software (e.g., threads, processes, computing devices). The servers 904 can house threads to perform transformations by employing the claimed subject matter, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   one or more processors; and
   memory, communicatively coupled to the one or more processors, storing an analysis component configured to:
      present a first plurality of security configuration changes to an administrator;
      receive feedback from the administrator on each of the first plurality of security configuration changes, wherein the feedback received from the administrator includes an approval or a disapproval of each of the first plurality of security configuration changes;
      analyze the feedback;
      store the feedback received from the administrator including the approval or the disapproval of each of the first plurality of security configuration changes; and
      generate a second plurality of security configuration changes based at least in part on the feedback received from the administrator and previously stored feedback received from the administrator, wherein the second plurality of security configuration changes are different from the first plurality of security configuration changes.

2. The system of claim 1, the analysis component further configured to utilize the feedback received from the administrator to simulate approved changes of the first plurality of security configuration changes prior to generating the second plurality of security configuration changes.

3. The system of claim 1, the analysis component constructs an attack graph that includes one or more of accounts, machines, or security groups, the one or more of accounts, machines, or security groups employed as a plurality of nodes in the attack graph, each of the plurality of nodes connected by one or more edges, the one or more edges created by directing the one or more edges from one or more machines to at least one of the one or more accounts or the one or more security groups.

4. The system of claim 3, the analysis component performs a cut of the attack graph based at least in part on at least one of a relative edge distance assigned to each of the one or more edges or a density of the one or more edges that interconnect the one or more machines to the one or more accounts or to the one or more security groups.

5. The system of claim 4, the analysis component associates a cost to each of the one or more edges, the cost associated with each of the one or more edges based at least in part on the feedback supplied by the administrator, the cost learned via a machine learning algorithm.

6. The system of claim 1, the analysis component constructs an attack graph that includes one or more security groups nested hierarchically.

7. The system of claim 1, the analysis component further configured to present the second plurality of security configuration changes to the administrator for additional feedback.

8. The system of claim 1, the analysis component further configured to simulate the second plurality of security configuration changes.

9. A method comprising:
   executing an analysis component by a processor of a machine to generate a plurality of security configuration changes;
   receiving feedback in the form of an approval or a disapproval from an administrator of each change included in the plurality of security configuration changes;
   employing machine learning to learn new security configuration changes based on the received feedback and previously stored feedback from the administrator; and
   generating a further plurality of security configuration changes based at least in part on the machine learning, wherein the further plurality of security configuration changes includes the new security configuration changes learned from employing the machine learning.

10. The method of claim 9, further comprising simulating the approved security configuration changes.

11. The method of claim 9, the further plurality of security configuration changes determined based on an attack graph.

12. The method of claim 11, the attack graph includes an account, a machine, or a security group, wherein the account, the machine, or the security group forms a node in the attack graph.

13. The method of claim 12, the nodes in the attack graph connected by one or more edge that points from at least one of the account or the security group to the machine.

14. The method of claim 13, wherein the one or more edge is associated with a cost, wherein the cost is assigned a value based at least in part on the feedback received from the administrator.

15. The method of claim 12, the nodes in the attack graph connected by one or more edge from the account to the security group.

16. The method of claim 12, wherein the security group forms a nested hierarchy with an additional security group.

17. The method of claim 9, further comprising:
   receiving additional feedback in the form of an approval or a disapproval from the administrator of each change included in the further plurality of security configuration changes;
   simulating each of the further plurality of security configuration changes on an attack graph based on the additional feedback received; and employing the machine learning method to learn additional security configuration changes based on the feedback and the additional feedback from the administrator.

18. A system comprising:
one or more processors; and
memory, communicatively coupled to the one or more processors, storing an analysis component configured to:
construct an attack graph with nodes made from accounts, machines, or security groups, the nodes connected by an edge, wherein the edge represents a control relationship;
estimate an edge cost, the edge cost being used at least in part to determine removal of the edge from the attack graph;
receive feedback from an administrator on a willingness to implement a security configuration change;
re-estimate the edge cost based on the feedback received from the administrator;
compare the estimated edge cost to the re-estimated edge cost;
employ machine learning to learn, based on the comparison, new security configuration changes the administrator is likely to select next; and
produce a plurality of cut proposals of the attack graph based at least in part on the re-estimated edge cost.

19. The system of claim 18, wherein the re-estimated edge cost is further based on the machine learning.

20. The system of claim 18, wherein the plurality of cut proposals of the attack graph is determined by a sparsest cut algorithm.

* * * * *